July 29, 1969   C. COOLEY, JR   3,458,167
BALANCING MECHANISM
Filed Dec. 28, 1966   4 Sheets-Sheet 4
FIG_6
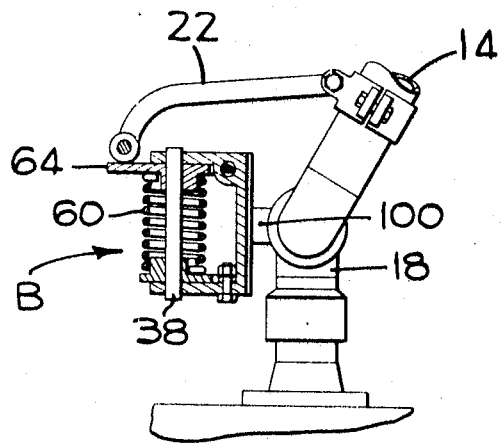
FIG_7
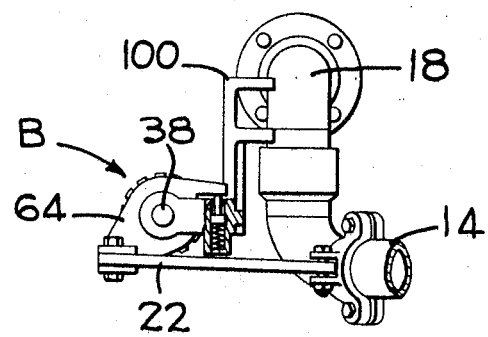
FIG_8
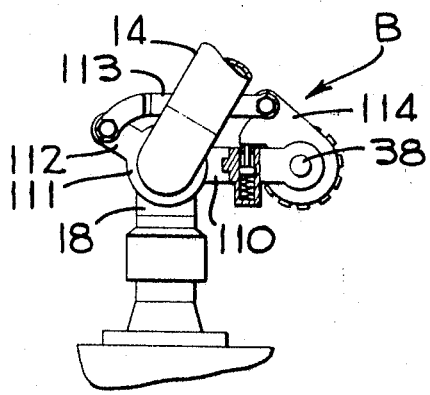
FIG_9
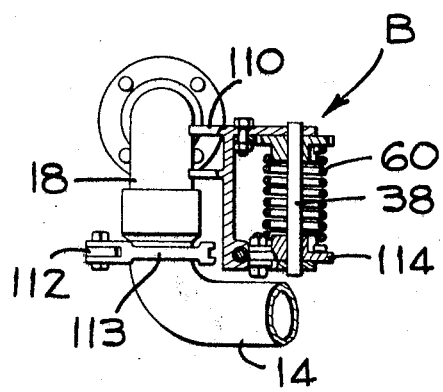
INVENTOR
CLAIBORN COOLEY, JR.
BY Francis W. Anderson
ATTORNEY United States Patent Office 3,458,167
Patented July 29, 1969

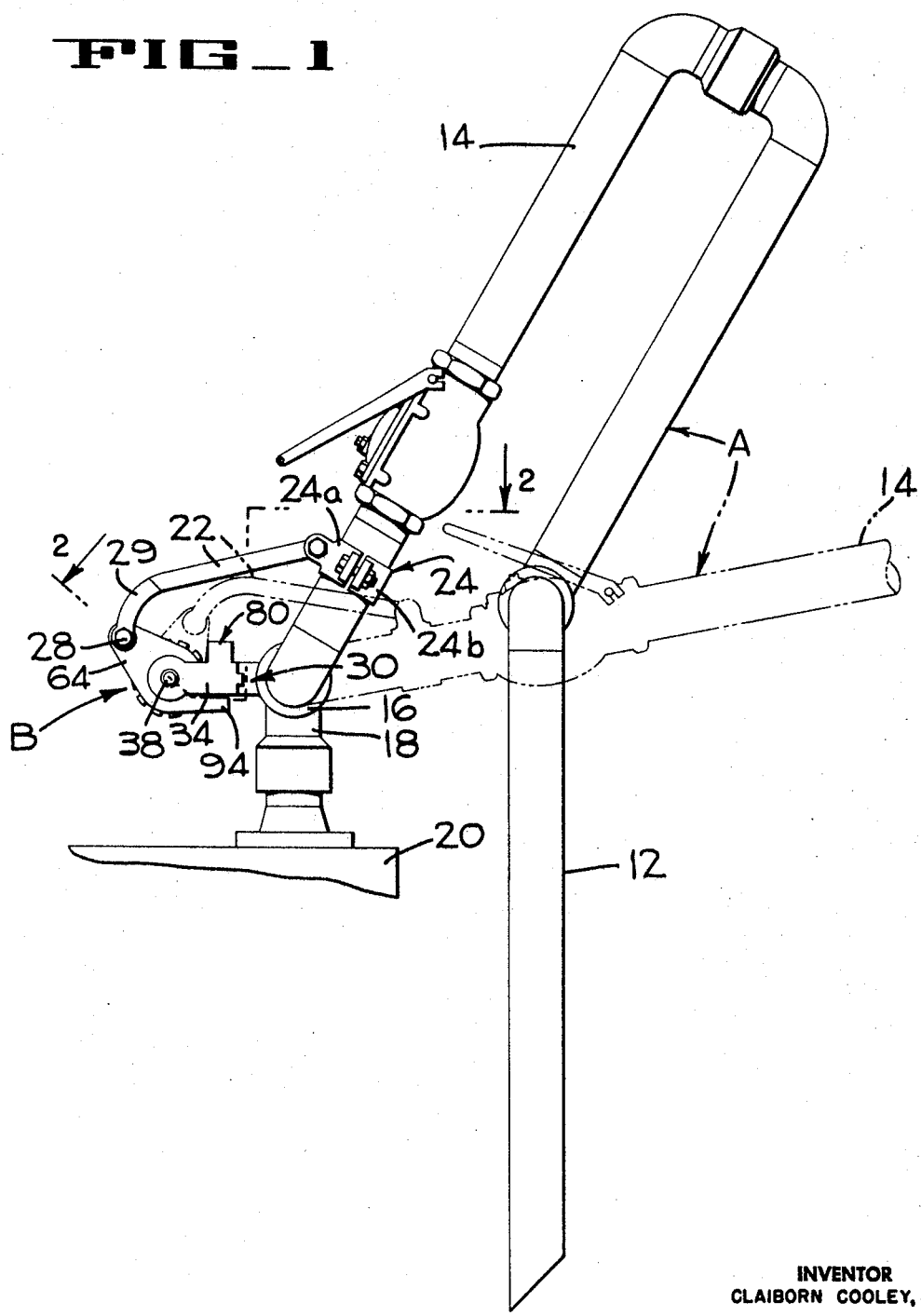

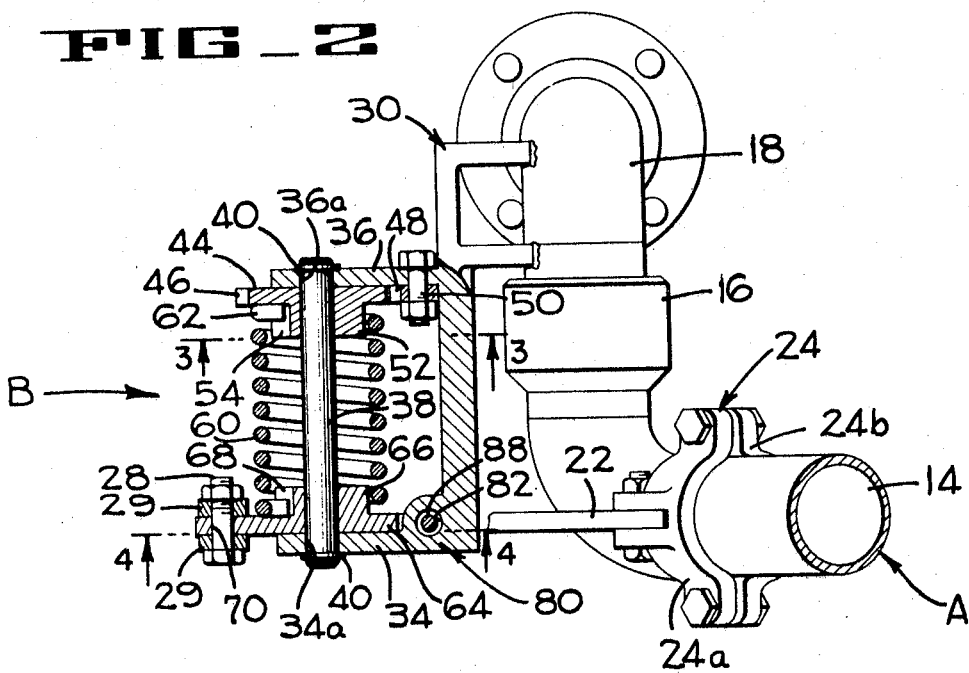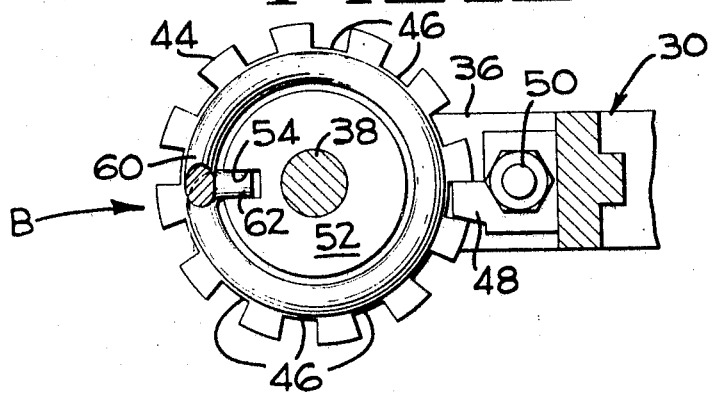

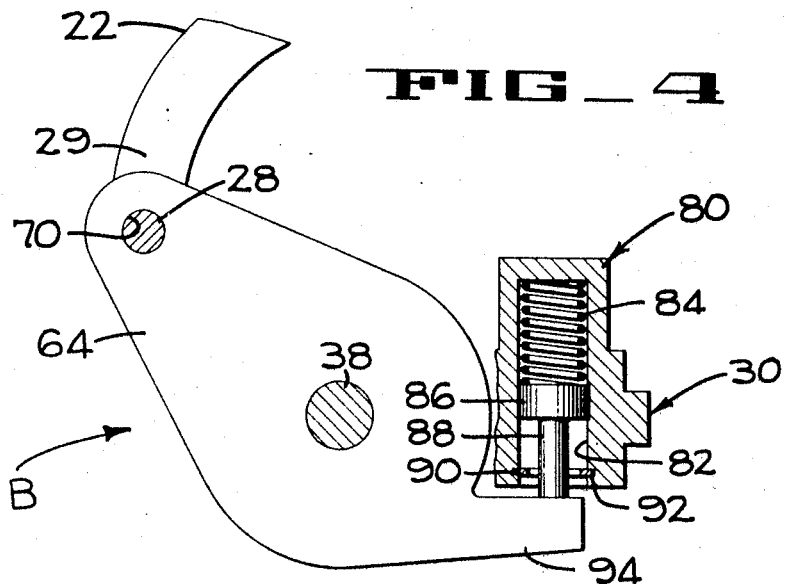
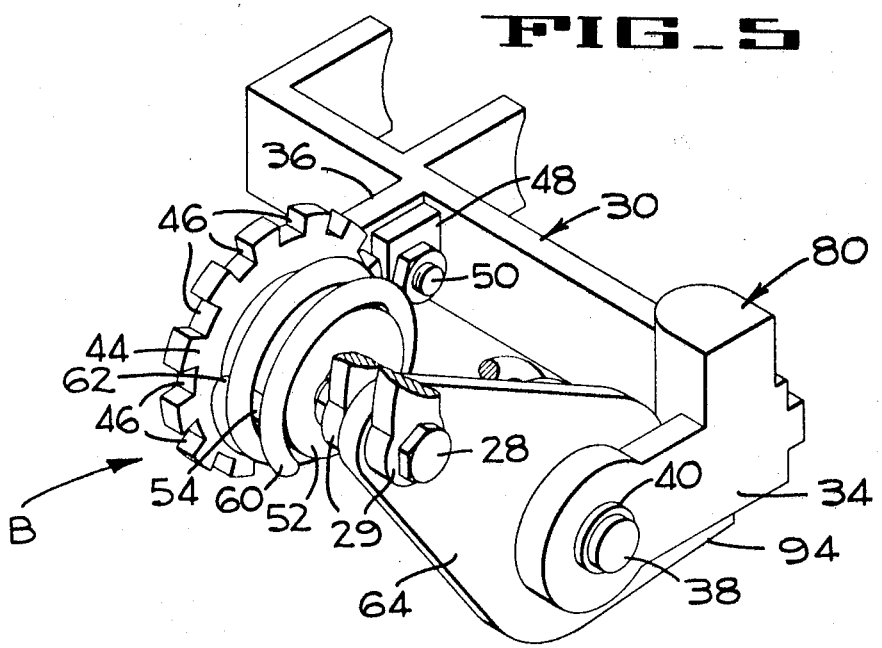

3,458,167
BALANCING MECHANISM
Claiborn Cooley, Jr., Houston, Tex., assignor to FMC Corporation, San Jose, Calif., a corporation of Delaware
Filed Dec. 28, 1966, Ser. No. 605,357
Int. Cl. A47f 5/00
U.S. Cl. 248—292                                    3 Claims

ABSTRACT OF THE DISCLOSURE

Apparatus for balancing a loading arm comprising a support, a torsion spring in the support which becomes wound to offset the weight of an extended loading arm and a shock absorbing apparatus formed integrally with the support to cushion the impact of a raised loading arm.

---

This invention relates to a balancing mechanism for a material conveying apparatus, and more particularly to an improved balancing mechanism for use on loading arms of the type employed for transferring liquids between two storage areas one of which can be movable.

Loading arms are often extremely heavy and of considerable length such that it is necessary to provide a balancing mechanism to counteract their weight and to permit an operator to readily position the discharge end of the conduit without the necessity of manipulating cables. Since loading arms are often used on a crowded dock it also is necessary that the balancing mechanism used to counteract the weight of the loading arm be very compact while still being of sufficient strength to withstand the forces to which it is subjected during normal use.

It is an object, therefore, of this invention to provide a balancing mechanism which is both strong and compact.

It is another object of this invention to provide a balancing mechanism for counteracting the weight of a loading arm and for absorbing the shock of the loading arm when it is raised to its highest position.

Another object is to provide a shock absorbing unit for a balancing mechanism of a loading arm.

Other objects and advantages will become apparent from the following description and figures of the drawing in which:

FIGURE 1 is a schematic side elevation of a loading arm embodying the instant invention in its raised position, and also showing a portion of a loading arm in phantom lines in a lowered position.

FIGURE 2 is an enlarged fragmentary plan of the apparatus shown in FIGURE 1 and is partly in section as taken along the line 2—2 of FIGURE 1.

FIGURE 3 is an enlarged fragmentary section taken on a plane at the position indicated by line 3—3 of FIGURE 2.

FIGURE 4 is an enlarged section taken generally along the line 4—4 of FIGURE 2.

FIGURE 5 is an enlarged fragmentary isometric of a portion of the balancing mechanism shown in FIGURE 1.

FIGURE 6 is a fragmentary elevation, shown partly in section, of a modified form of the invention.

FIGURE 7 is a fragmentary plan, shown partly in section, of the modification shown in FIGURE 6.

FIGURE 8 is a fragmentary elevation, shown partly in section, of still another modification of the invention.

FIGURE 9 is a plan, shown partially in section, of the modification shown in FIGURE 8.

In general, the invention may best be described by referring to FIGURE 1 in which is shown a loading arm indicated generally by the reference character A. In the embodiment illustrated, the loading arm is mounted on a stationary dock, or the like, and its free end is movable to be positioned over a movable tank such as the storage tank of a vessel being refueled; however, the loading arm could be mounted on the movable tank and moved over the dock if desired. The loading arm comprises an outer conduit 12 adapted to be positioned over a tank, not shown, and a vertically pivotable inner conduit 14. The inner conduit is swivelly mounted by means of a conventional swivel joint 16 on a riser 18 connected to a stationary tank 20. The riser is rotatable about a vertical axis and communicates with the interior of the stationary tank such that material may be moved into or out of the tank through the outer and inner conduits. Fixed to the riser as by welding is a balancing mechanism B.

The balancing mechanism B comprises a movable connecting arm 22 pivotally connected to a yoke 24a of a bracket 24. The bracket 24 is of a conventional design and is bolted tightly against the inner conduit 14 by a clamp 24b. The bracket, as is readily apparent, is adjustable and may be slid along the inner conduit or rotated about the longitudinal axis thereof. The distal end of the connecting arm is divided into spaced arms 29 (FIG. 5) and is pivotally connected to the balancing mechanism B by a pivot bolt 28. Thus, the connecting arm provides a direct linkage between the inner conduit and the balancing mechanism.

The balancing mechanism B, as best shown in FIGURES 2-5, is fixed to the riser by a support 30. Although the support is shown welded to the riser, a suitable adjustable fastener may be employed if desired. The support is also provided with a pair of spaced parallel arms 34 and 36. The arms are provided with apertures 34a and 36a, respectively, through which is received an axle 38. The axle is held against axial movement in the apertures by a set of conventional spring clips 40. Circumscribing the axle 38 and located flush against the inner face of the arm 36 is an annular adjustment plate 44. The circumference of the plate is provided with a plurality of equally spaced cogs 46 which are adapted to be engaged by a pawl 48 (FIG. 3) fastened to the arm 36 by a bolt 50. The pawl serves to lock the adjustment plate against rotational movement. Formed integrally on the plate 44 is an axially extending hub 52. The hub is provided with a slot 54 parallel with the axle. Circumscribing the axle and the hub is a conventional torsion spring 60. One end of the torsion spring is bent radially inward as at 62 and engages the side walls of the slot 54 in the fixed hub 52. Thus, when the end of the spring is engaged in the slot, the spring is anchored against rotational movement. By rotating the other end of the spring about axle 38, the torsion spring is either wound or unwound depending upon the direction of rotation.

Circumscribing the axle 38 and mounted flush against the inner face of the arm 34 is a torque lever 64. The lever, like the adjustment plate 44, is provided with an axially extending hub 66 having a slot 68 also parallel with the axle 38. The slot receives the free end of the torsion spring 60 in such a manner that rotational movement of the torque lever will result in winding or unwinding of the spring about the axle. The torque lever is apertured as at 70 to receive the pivot bolt 28 which also passes through the spaced arms 29 of the connecting arm 22. Consequently, the connecting arm is pivotally connected to the torque lever. As can be readily seen, vertical pivotal movement of the inner conduit 14 will result in rotation of the lever about the axle to cause winding or unwinding of the spring.

As is best shown in FIGURES 2 and 4, a buffer unit 80 is formed integrally in the support 30 adjacent the arm 34. The buffer unit comprises a blind bore 82 in which is positioned a compression spring 84. Also positioned in the bore and abutting the compression spring is a cylindrical buffer post 86. The buffer post has an extension 88 of a smaller diameter extending axially out of the bore. A retaining clip 90 is positioned in a groove 92 in the bore and precludes accidental removal of the buffer post. The torque lever 64 is provided with an extension member or buffer abutment 94 which underlies the extension 88 of the buffer post. Thus, when the torque lever is pivoted in the counterclockwise direction, as viewed in FIGURE 4, the buffer abutment engages the extension 88 to compress the coil spring. When the loading arm A is thrust upwardly, its momentum and the energy stored in the torsion spring 60 tend to pivot the torque lever counterclockwise about the axle 38. When the loading arm reaches its raised position, the buffer abutment 94 on the torque lever 64 engages the buffer post, and the compression spring 84 dampens the shock due to the upward movement of the loading arm as it returns to its rest position.

The modification shown in FIGURES 6 and 7 is quite similar to the preferred embodiment shown in FIGURES 1–5. Many of the previously described elements are found in this modification and further description of these details will not be necessary. In the modification, however, the balancing mechanism B (in describing this modification, reference numerals corresponding to the reference numerals of the same parts shown in the preferred embodiment are used) is arranged with the axle 38 vertically disposed. The axle is held in this vertical position by a slightly modified support 100 which is fixed to the riser 18. As can be readily seen, if the inner conduit 14 is pivoted in a vertical plane the connecting arm 22 will cause the spring lever 64 to wind and unwind the torsion spring 60.

The modification shown in FIGURES 8 and 9 is also similar to the preferred embodiment shown in FIGURES 1–5. Reference numerals corresponding to those applied in the preferred embodiment will again be used to designate similar parts in this modification. The balancing mechanism B, in the FIGURE 8 modification, is fastened to the riser 18 with the axle 38 horizontal, much as in the preferred embodiment. In the modification, however, a modified support 110 is fastened to the side of the riser 18 opposite the side to which the support 30 was fastened in the preferred embodiment (see FIG. 1). A modified bracket 111 in the form of a collar, which may be clamped or welded to the inner conduit 14, is provided with an ear 112 to which is bolted a modified connecting arm 113. The connecting arm is pivotally fastened at its other end to an extension of a modified spring lever 114. Although the structure is slightly different, the operating principle of this modification is the same as in the preferred embodiment. As can be readily seen, when the tubular conduit 14 is pivoted in a clockwise position, as viewed in FIGURE 8, the connecting arm 113 moves the spring lever 114 clockwise about the axle 38 to wind-up the spring 60.

The operation of the preferred embodiment and the modifications are substantially the same thus only the former will be described. In the operation of the preferred embodiment the torsion spring 60 is locked in position by the locking pawl 48. Then a slight amount of torque is applied to preload the torsion spring by twisting it in the clockwise direction, as viewed in FIGURE 1, before attaching the connecting arm 22 to the bracket 24. In the alternative, the connecting arm can first be connected to the bracket and a special spanner wrench used on the cogs 46, after the locking pawl is removed, to pivot the hub 44 in the counterclockwise direction, as viewed in FIGURE 3, to preload the torsion spring. With the desired preload applied, the locking pawl 48 may then be bolted to the arm 36 and the wrench removed. The energy stored in the torsion spring 60 after being preloaded should approximately equal the force necessary to counterbalance the weight of the outer and inner conduits 12 and 14 such that they may be lowered or raised very easily by a single operator. When it is desired to use the loading arm A, the operator grasps the lower end of the outer conduit 12 and pulls it downwardly into place over the inlet of the movable tank (not shown) to be filled or emptied. When the loading operation is finished, the operator merely raises the conduits, with the assistance of the torsion spring, to a storage position similar to that shown in FIGURE 1. Should the operator thrust the loading arm into its storage position with excessive force, the buffer unit 80 will cushion the shock preventing damage to the balancing mechanism.

As is readily apparent, by forming the buffer unit 80 as an integral part of the support 30 the balancing mechanism has the advantage of being very compact. In any of these positions the balancing mechanism is also out of the way of personnel working around the loading arm making it a safe as well as inexpensive apparatus to balance the weight of the conduit.

A further advantage lies in the increased strength of the balancing mechanism realized by forming the buffer unit integrally with the support.

Although the preferred apparatus for carrying out the invention has been shown and described, it will be understood that it is capable of still more modification and variation while still operating according to the principles of the invention. It is to be understood, therefore, that the scope of the invention is limited only by the claims appended hereto.

Having thus described the invention, that which is believed to be new and for which the protection by Letters Patent is desired is:

1. A balancing mechanism for a material conveying apparatus having a member pivotally connected to a support for elevational movement thereon, comprising
 (a) a bracket for holding said mechanism in an operable position relative to said support and member, said bracket including a relatively elongated central portion and a pair of spaced parallel arms integral with and extending laterally from said central section;
 (b) a torsion spring extending axially between said arms for supplying a balancing force for said member;
 (c) a torque lever connected to said torsion spring for transmitting said balancing force from said spring to said member;
 (d) a buffer abutment integral and coplanar with said torque lever and extending generally radially outward from said torsion spring, and
 (e) a buffer unit for engaging said buffer abutment to resist movement of said torque lever, said buffer unit including a blind bore in said bracket generally at the intersection of one of said arms and said central portion with its axis disposed perpendicular to the longitudinal axes of said arm and central portion, a compression spring positioned in said bore, and a post positioned in said bore and extending outwardly therefrom, said post engaging said spring and being coplanar with said abutment and said torque lever whereby when said abutment strikes said post the shock created thereby is absorbed by said buffer unit.

2. The mechanism of claim 1 wherein the axis of said torsion spring is parallel to the pivot axis of said member.

3. The mechanism of claim 1 wherein the axis of said torsion spring is perpendicular to the pivot axis of said member.

(References on following page)

References Cited

UNITED STATES PATENTS 3,038,714   6/1962   Klaus _____ 248—292 XR

WILLIAM F. O'DEA, Primary Examiner

HOWARD M. COHN, Assistant Examiner

U.S. Cl. X.R.

137—615; 267—1